(12) United States Patent
Summerville et al.

(10) Patent No.: US 8,051,526 B2
(45) Date of Patent: Nov. 8, 2011

(54) COVERED WIPER FOR VEHICLE WINDOW

(75) Inventors: Wendell G. Summerville, Ferndale, MI (US); Mark K Denison, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 408 days.

(21) Appl. No.: 12/419,351

(22) Filed: Apr. 7, 2009

(65) Prior Publication Data
US 2010/0251502 A1    Oct. 7, 2010

(51) Int. Cl.
*B60S 1/34*    (2006.01)
(52) U.S. Cl. .............................. 15/250.351; 15/250.201
(58) Field of Classification Search ............. 15/250.351, 15/250.352, 250.201, 250.001, 257.01; D12/219
See application file for complete search history.

(56) References Cited

U.S. PATENT DOCUMENTS

| 3,160,906 A | 12/1964 | Morena |
| 3,263,261 A * | 8/1966 | Schulz ........................ 15/257.01 |
| 6,070,287 A | 6/2000 | Kornegay |
| D538,218 S | 3/2007 | Elwell |

FOREIGN PATENT DOCUMENTS
FR    2652325    *    3/1991
* cited by examiner

*Primary Examiner* — Gary Graham

(57) ABSTRACT

A covered windshield wiper includes a hub, a wiper arm having spaced apart side walls, and a pivot pin connecting the wiper arm to the hub. A pair of abutments coaxial with the pivot pin space the side walls of the wiper arm from the hub. A one-piece molded cover has a u-shaped cross section providing a base wall overlying the entire length of the wiper arm and the wiper blade, and laterally spaced side walls depending from the base wall and concealing from view both the wiper arm and the wiper blade. A hook molded on the cover engages the end of the wiper arm. A pair of snap tabs molded on the cover reach into the space between the side walls of the wiper arm and the hub to snap onto the pair of abutments and thereby removably attach the cover onto the wiper.

20 Claims, 3 Drawing Sheets

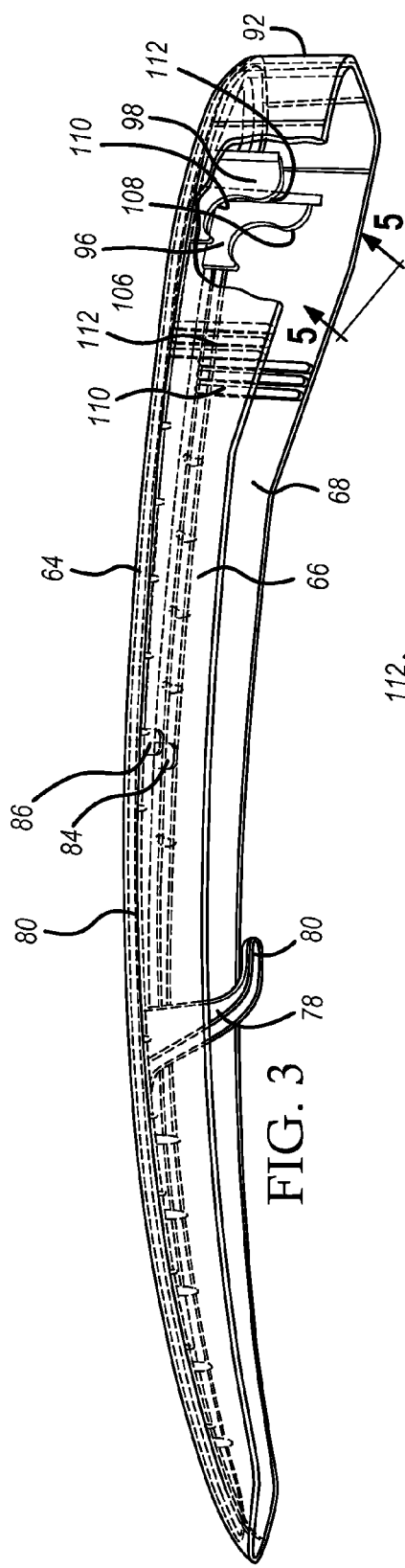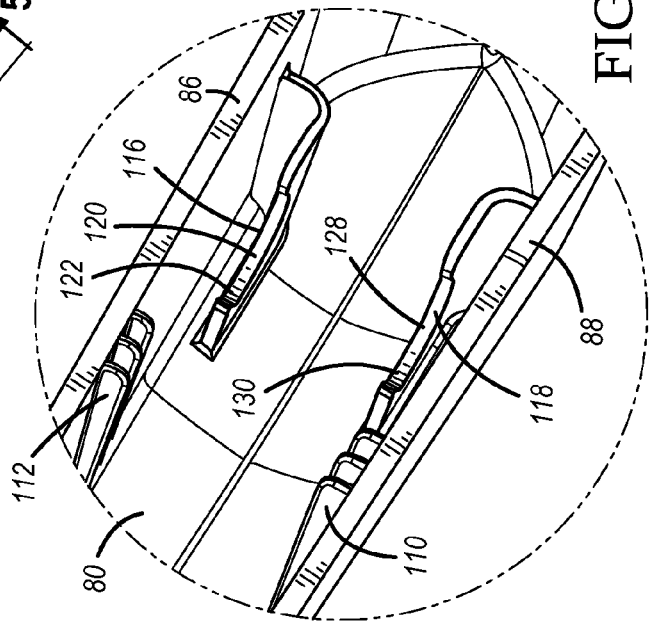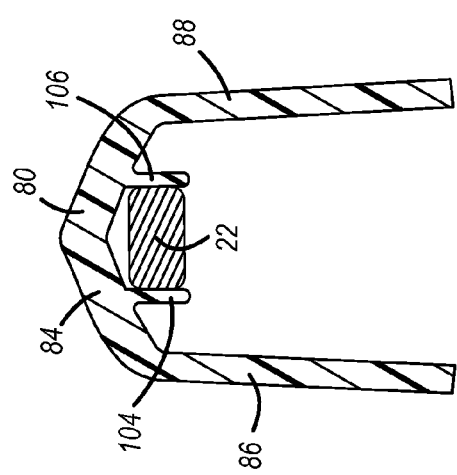

US 8,051,526 B2

COVERED WIPER FOR VEHICLE WINDOW

FIELD OF THE INVENTION

The present invention relates to a wiper on the window of a motor vehicle and more particularly provides a one-piece molded snap-on plastic cover that enhances the appearance of the wiper by entirely covering the wiper arm and the blade.

BACKGROUND OF THE INVENTION

It is well known in motor vehicles to provide a windshield wiper for wiping rain and snow from the windshield or a rear window. Windshield wipers conventionally include a metallic windshield wiper arm that has one end seated upon the drive shaft of a windshield wiper motor. A removable and replaceable windshield wiper blade is attached to the other end of the windshield wiper arm. The windshield wiper blade is removable from the end of the arm for replacement by a new blade after the blade becomes worn.

Thus the windshield wiper arm and blade are of necessity comprised of various metallic and plastic parts, with pivots, springs, arms and shapes that cooperate to perform the function of wiping the glass surface of the window. Although very functional, the windshield wiper can detract from the overall aesthetic beauty of the vehicle.

It would be desirable to provide a new and improved cover that would fit over the windshield wiper arm and blade in order to improve the appearance of the vehicle by providing an aesthetically pleasing appearance and yet be readily removable so that the blade can be replaced.

SUMMARY OF THE INVENTION

A covered windshield wiper includes a hub, a wiper arm having spaced-apart side walls, and a pivot pin connecting the wiper arm to the hub. A pair of abutments coaxial with the pivot pin space the side walls of the wiper arm from the hub. A one-piece molded cover has a u-shaped cross section providing a base wall overlying the entire length of the wiper arm and the wiper blade, and laterally spaced side walls depending from the base wall and concealing from view both the wiper arm and the wiper blade. A hook molded on the cover engages the end of the wiper arm. A pair of snap tabs molded on the cover reach into the space between the side walls of the wiper arm and the hub to snap onto the pair of abutments and thereby removably attach the cover onto the wiper.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is another perspective view but showing only the cover and having parts broken away to show the interior details of the cover by which the cover is removably snap-fit onto the wiper arm.

FIG. 4 is a section view taken in the direction of arrows 4-4 of FIG. 2.

FIG. 5 is a view taken in the direction of arrows 5-5 of FIG. 3.

DETAILED DESCRIPTION OF THE EXEMPLARY EMBODIMENTS

The following description of certain exemplary embodiments is merely exemplary in nature and is not intended to limit the invention, its application, or uses.

Figure 1:
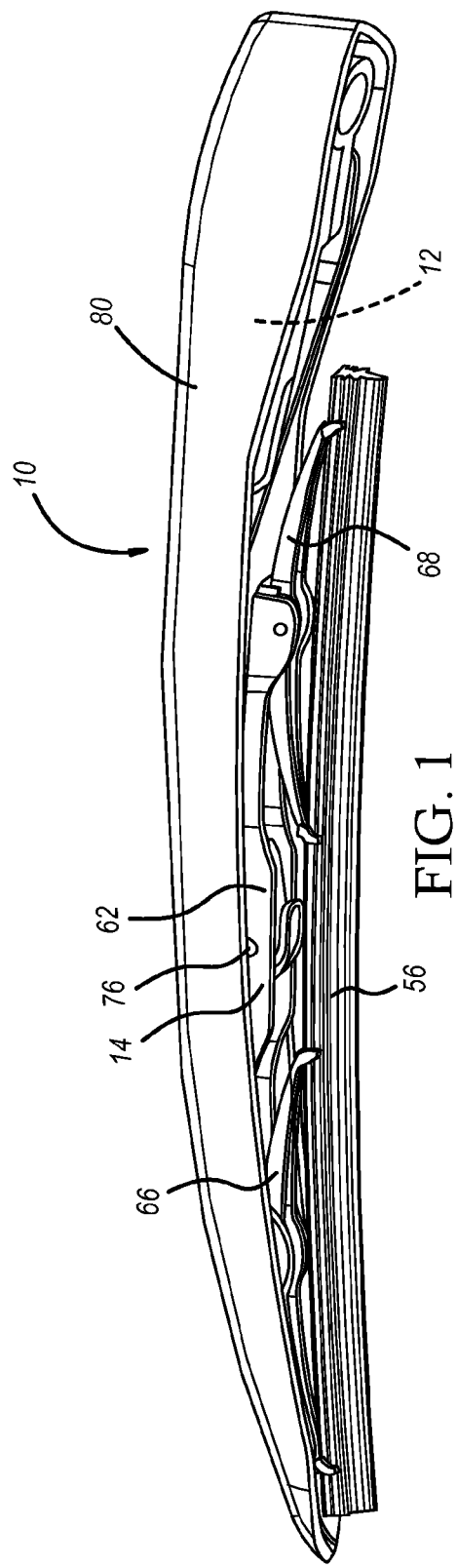
FIG. 1 is a perspective view of a windshield wiper arm and blade concealed by the wiper arm cover of this invention.
Figure 2:
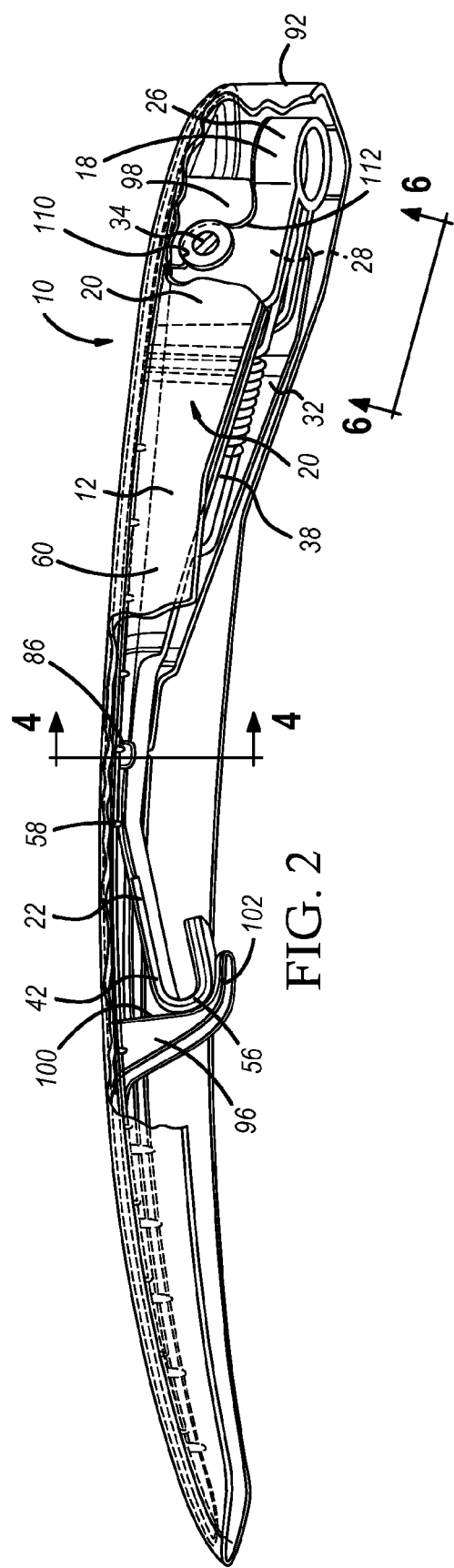
FIG. 2 is a perspective view similar to FIG. 1 having parts broken away to show the attachment of the cover onto the wiper arm.

Referring to FIGS. 1 and 2, it is seen that a conventional windshield wiper 10 includes a wiper arm assembly 12 and a wiper blade assembly 14.

The wiper arm assembly 12 best seen in FIG. 2, is comprised of three elements, including a hub 18 at a first end, a bracket 20, and an extension 22 at the second end. The hub 18, as seen also in FIG. 6, includes a socket 26 that snaps onto a drive shaft of a windshield wiper motor, not shown. The hub 18 also includes a pair of spaced apart arms 28 and 29.

Figure 6:
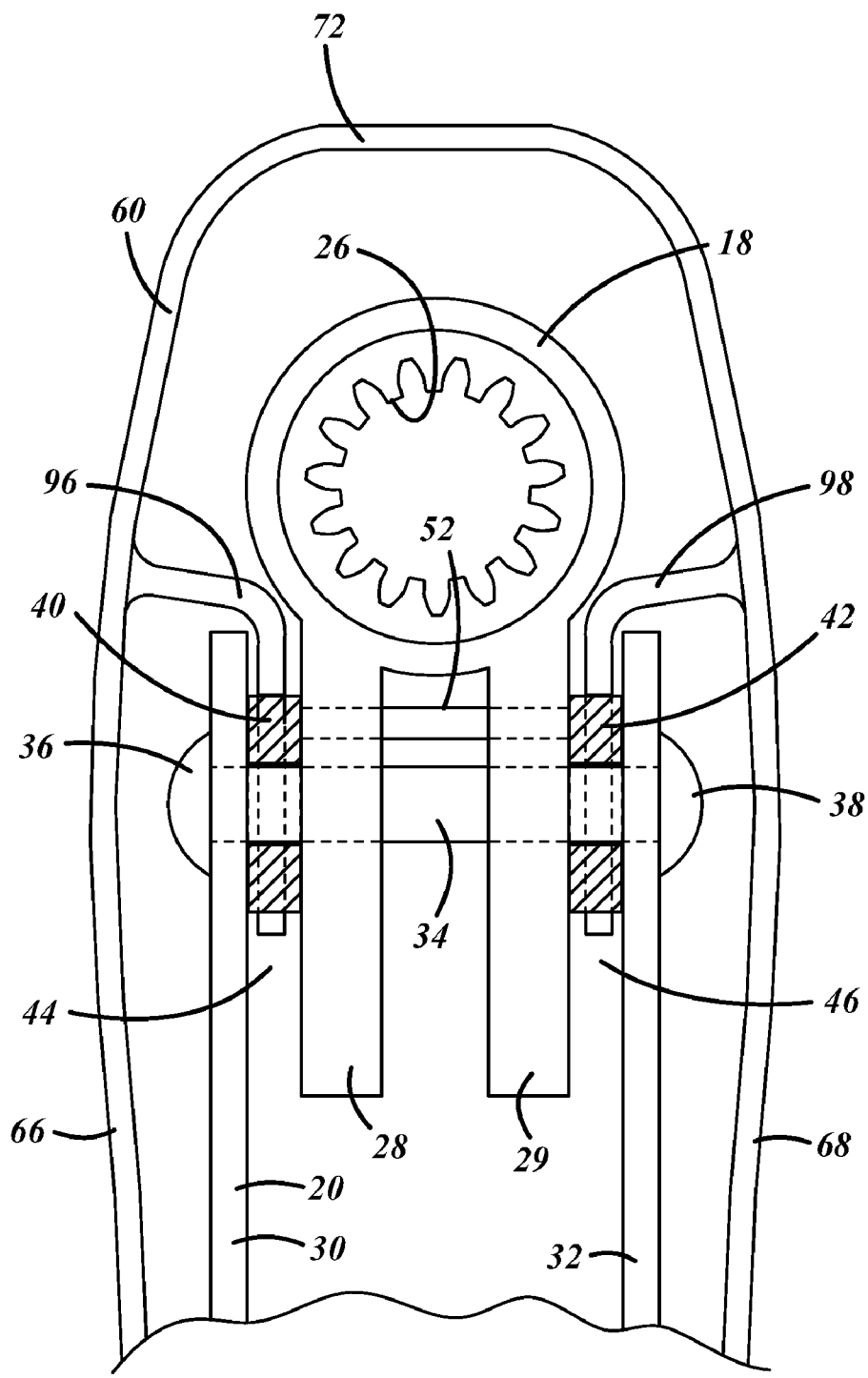
FIG. 6 is a view taken in the direction of arrows 6-6 of FIG. 2.

As seen in FIGS. 2 and 6, the bracket 20 of the arm assembly 12 is an inverted u-shaped stamping having spaced apart walls 30 and 32 that straddle the spaced apart arms 28 and 29 of the hub 18. A pivot pin 34 extends through aligned apertures in the arms 28 and 29 of the hub 18 and apertures in the walls 30 and 32. The pivot pin 34 has a head 36 at one end and a peened head 38 at the other end to thereby pivotally connect the bracket 20 to the hub 18. As seen in FIG. 6, a washer 40 encircles the pivot pin 34 and is interposed between the wall 30 of bracket 20 and the arm 28 of the hub 18. Another washer 42 encircles the pivot pin 34 and is interposed between the wall 32 of the bracket 20 and arm 29 of the hub 18. The presence of the washer 40 assures that a space 44 exists between the wall 30 of bracket 20 and the arm 28 of the hub 18, and the presence of the washer 42 assures that a space 46 exists between the wall 32 of the bracket 20 and arm 29 of the hub 18. The washers 40 and 42 are round and are coaxial with the pivot axis of bracket 20 defined by pivot pin 34.

As seen in FIG. 2, a spring 50 acts between a roll pin 52 installed in the hub 18 and the bracket 20 to bias the arm assembly 12 about the pivot pin 34 in the direction toward the window glass.

As seen in FIG. 2, the extension 22 is conventionally attached to the bracket 20, as by welding, and has a J-shaped hook 56 at the end to which the wiper blade assembly 14 is removably attached as will be discussed hereinafter. The extension is bent at its center to form a rocker cam 58.

The wiper blade assembly 14 of FIG. 1 includes a wiper bracket 62 and rocker arms 66 and 68 that cooperate to mount a resilient wiper blade 72 that will engage with the window. Blade assembly 14 has a pivot pin 76 that is removably captured within the J-shaped hook 56 of the arm assembly 12.

A one-piece molded plastic cover 80 is provided for attachment onto the wiper assembly 10 to completely conceal both the arm assembly 12 and the blade assembly 14, and thereby improve the aesthetics of the motor vehicle. The cover 80 is a molded plastic channel having a U-shaped cross-section provided by a base wall 84 and laterally spaced side walls 86 and 88 that depend from the base wall 84. The base wall 84 lies generally along the top of the arm assembly 12 and blade assembly 14 and the laterally spaced side walls 86 and 88 depend from the base wall 84 toward the window for a distance sufficient to essentially conceal both the wiper arm assembly 12 and the wiper blade assembly 14 from view. In addition, the channel shape is closed at a closed end 92 so that the cover 80 will also cover the hub 18, including its socket 26.

The cover 80 includes integrally molded features by which the cover 80 can be readily snap attached onto the arm assembly 12, as well easily removed from the arm assembly 12. In particular, as best seen in FIG. 3, a J-shaped hook 96 is integrally molded with the cover 80, preferably at the base wall 84 and has a vertical surface 100 and hook end 102. The hook end 102 overlies and hooks onto the J-shaped hook 56 of the extension 22, as seen in FIG. 2. As seen in the drawings this hook end 102 is molded onto the cover 80 about midway of its overall length.

As best seen in FIG. 4, laterally spaced guide arms 104 and 106 are integrally molded with the cover 80 for straddling and engaging with the extension 22 to guide the cover 80 onto the arm assembly during installation.

In addition, laterally spaced guide arms 110 and 112 are also molded onto the interior of the cover 80, preferably on the depending side walls 86 and 88 to straddle and engage with the sides of the bracket 20 and thereby also assist in guiding the installation of the cover 80 onto the windshield wiper assembly 10.

As seen in FIGS. 3 and 5, the end of the cover 80 is snap retained onto the arm assembly 12 by a pair of snap tabs 116 and 118. In particular, it is seen by referring to FIG. 5, that the snap tabs 116 and 118 are molded integrally with both the base wall 84 and the side walls 86 and 88 in a manner such that the snap tabs 116 and 118 are spaced away from the side walls 86 and 88. As best seen in FIG. 3, the snap tab 116 has an arcuate recess 120 and an entry lip 122. Likewise, the snap tab 118 has an arcuate recess 128 and an entry lip 130.

As best seen in FIGS. 2 and 6, the cover 80 is snap retained onto the arm 28 of the hub 20 by the washers 40 and 42 becoming engaged by the snap tabs 116 and 118. In particular as seen in FIG. 2, the washer 42 has snapped past the entry lip 122 and been captured within the arcuate recess 120. Thus the washers serve as abutments for engagement by the snap tabs 116 and 118 for retaining the cover 80.

Referring to FIG. 2 it will be understood that in order to remove the cover 80, the closed end 92 of the cover is lifted upwardly relative the hub 18 so that the entry lips 122 and 130 will snap off the washers 40 and 42. As the right hand end of the cover 80 lifts off the hub 18, the cover 80 will pivot around the cam surface 58 during the pivoting of the cover 80 and the vertical surface 100 will slide over the end of the J-shaped hook 96. The washers 40 and 42 can rotate around the pivot pin 34 as needed to assist the snapping of the entry lip 122 and 130 over the washers.

The foregoing description of the invention is merely exemplary in nature and, thus, variations thereof are intended to be within the scope of the invention. For example, one or both of the washers 40 and 42 can be formed integrally onto the arms 28 and or 29 of the hub 18. Or one or both of the washers 40 and 42 can be formed integrally with the walls 30 and or 32 of the bracket 20 by forming the washer shape onto the arms walls 30 and 32. Or, one or both of the washers 40 and 42 can be formed integrally with the pivot pin 34. Thus the washers can be provided by any abutment structure that can be provided by separate pieces such as the washers, or can be integral with the hub 18 or the bracket 20 or the pivot pin 34. In addition it will be understood that the washers 40 and 42 are not limited to being circular in shape and can be of other shape that would inter-fit with corresponding shapes on the snap tabs 116 and 118.

What is claimed is:

1. A covered windshield wiper comprising:
   a hub;
   a wiper arm having spaced apart side walls and having a first end and a second end;
   a pivot pin connecting the first end of the wiper arm to the hub;
   a replaceable wiper blade removably mounted on the second end of the wiper arm;
   a pair of abutments coaxial with the pivot pin and spacing the side walls of the wiper arm from the hub;
   a cover being a one piece molded channel having a u-shaped cross section providing a base wall overlying the entire length of the wiper arm and the wiper blade and laterally spaced side walls depending from the base wall toward the window to cooperate with the base wall to entirely conceal from view both the wiper arm and the wiper blade, and a first closed end encircling and concealing the hub;
   a hook molded on the base wall and engaging on the second end of the wiper arm;
   and a pair of snap tabs molded on the cover and reaching into the spacing between the side walls of the wiper arm and the hub to snap onto the pair of abutments and thereby removably attach the cover onto the wiper.

2. The covered windshield wiper of claim 1 further comprising said pair of abutments being washers that encircle the pivot pin and space the wiper arm side walls from the hub and are snap engaged by the snap tabs.

3. The covered windshield wiper of claim 1 further comprising one or both of said pair of abutments being formed integral with the side walls of the wiper arm.

4. The covered windshield wiper of claim 1 further comprising one or both of said pair of abutments formed integral with the pivot pin.

5. The covered windshield wiper of claim 1 further comprising one or both of said pair of abutments being a washer that encircles the pivot pin.

6. The covered windshield wiper of claim 1 further comprising said hook being J-shaped and having a vertical surface that slides on the second end of the wiper arm upon installation or removal of the cover and a hook end that hooks the cover onto the wiper arm.

7. The covered windshield wiper of claim 1 further comprising said wiper arm defining a rocker cam that is engaged by the base wall of the cover and about which the cover pivots during the installation or removal of the cover.

8. The covered windshield wiper of claim 1 further comprising one or more pair of guide arms that depend from either the base wall or side walls of the cover to engage with the wiper arm intermediate its first and second ends to guide the installation of the cover onto the wiper.

9. The covered windshield wiper of claim 1 further comprising the wiper arm including a stamped steel bracket pivoted to the hub and an extension extending from the bracket and providing a J-shaped hook upon which the wiper blade is mounted.

10. A covered windshield wiper comprising:
    a hub;
    a wiper arm having spaced apart side walls and having a first end and a second end;
    a pivot pin extending between the side walls of the wiper arm and the hub to connect the first end of the wiper arm to the hub;

a replaceable wiper blade removably mounted on the second end of the wiper arm;

a pair of washers mounted on the pivot pin between the respective side walls and the hub and spacing the side walls of the wiper arm from the hub;

a cover being a one piece molded channel having a u-shaped cross section providing a base wall overlying the entire length of the wiper arm and the wiper blade and laterally spaced side walls depending from the base toward the window to cooperate with the base wall to entirely conceal from view both the wiper arm and the wiper blade, and a first closed end encircling and concealing the hub;

a hook molded on the base wall and engaging on the second end of the wiper arm;

and a pair of snap tabs molded on the cover and reaching into the spacing between the side walls of the wiper arm and the hub to snap onto the pair of washers and thereby removably attach the cover onto the wiper.

11. The covered windshield wiper of claim 10 further comprising said hook being J-shaped and having a vertical surface that slides on the second end of the wiper arm upon installation or removal of the cover and a hook end that hooks the cover onto the wiper arm.

12. The covered windshield wiper of claim 10 further comprising said wiper arm defining a rocker cam that is engaged by the base wall of the cover and about which the cover pivots during the installation or removal of the cover.

13. The covered windshield wiper of claim 10 further comprising said wiper arm defining a rocker cam that is engaged by the base wall of the cover and about which the cover pivots during the installation or removal of the cover and said hook being J-shaped and having a vertical surface that slides on the second end of the wiper arm as the cover pivots about the rocker cam upon installation or removal of the cover, and a hook end that hooks the cover onto the wiper arm.

14. The covered windshield wiper of claim 13 further comprising a first pair of guide arms that depend from either the base wall or side walls of the cover to engage with the wiper arm intermediate its first and second ends to guide the installation of the cover onto the wiper and a second pair of guide arms spaced from the first pair of guide arms and also depending from either the base wall or side walls of the cover to engage with the wiper arm intermediate its first and second ends to guide the installation of the cover onto the wiper.

15. The covered windshield wiper of claim 14 further comprising the wiper arm including a stamped steel bracket pivoted to the hub and an extension extending from the bracket and providing a J-shaped hook upon which the wiper blade is mounted.

16. The covered windshield wiper of claim 10 further comprising one or more pair of guide arms that depend from either the base wall or side walls of the cover to engage with the wiper arm intermediate its first and second ends to guide the installation of the cover onto the wiper.

17. The covered windshield wiper of claim 10 further comprising the wiper arm including a stamped steel bracket pivoted to the hub and an extension extending from the bracket and providing a J-shaped hook upon which the wiper blade is mounted.

18. A covered windshield wiper comprising:

a hub;

a wiper arm having spaced apart side walls and having a first end and a second end with a rocker cam between the first and second ends;

a pivot pin extending between the side walls of the wiper arm and the hub to connect the first end of the wiper arm to the hub;

a replaceable wiper blade removably mounted on the second end of the wiper arm;

a pair of washers mounted on the pivot pin between the respective side walls and the hub and spacing the side walls of the wiper arm from the hub;

a cover being a one piece molded channel having a u-shaped cross section providing a base wall overlying the entire length of the wiper arm and the wiper blade and laterally spaced side walls depending from the base toward the window to cooperate with the base wall to entirely conceal from view both the wiper arm and the wiper blade, and a first closed end encircling and concealing the hub;

a J-shaped hook molded on the base wall and engaging on the second end of the wiper arm shaped and having a vertical surface that slides on the second end of the wiper arm upon installation or removal of the cover onto the wiper arm;

and a pair of snap tabs molded on the cover and reaching into the spacing between the side walls of the wiper arm and the hub to snap onto the pair of washers and thereby removably attach the cover onto the wiper.

19. The covered windshield wiper of claim 18 further comprising one or more pair of guide arms that depend from either the base wall or side walls of the cover to engage with the wiper arm intermediate its first and second ends to guide the installation of the cover onto the wiper.

20. The covered windshield wiper of claim 18 further comprising the wiper arm including a stamped steel bracket pivoted to the hub and an extension extending from the bracket and providing a J-shaped hook upon which the wiper blade is mounted.

* * * * *